United States Patent
Stenhouse (10) Patent No.: US 6,644,067 B2
(45) Date of Patent: Nov. 11, 2003

(54) DISCONTINUOUS CRYOGENIC MIXED GAS REFRIGERATION SYSTEM AND METHOD

(75) Inventor: James Stenhouse, Weston Favell (GB)

(73) Assignee: Telmark Cryogenics Limited, Northampton (GB)

(*) Notice: Subject to any disclaimer, the term of this patent is extended or adjusted under 35 U.S.C. 154(b) by 0 days.

(21) Appl. No.: 10/010,010

(22) Filed: Nov. 9, 2001

(65) Prior Publication Data

US 2002/0134104 A1 Sep. 26, 2002

Related U.S. Application Data

(60) Provisional application No. 60/293,759, filed on May 25, 2001, provisional application No. 60/252,948, filed on Nov. 24, 2000, and provisional application No. 60/247,323, filed on Nov. 10, 2000.

(51) Int. Cl.⁷ .............................. F25B 41/00
(52) U.S. Cl. ........................... 62/513; 62/612
(58) Field of Search ................. 62/502, 512, 513, 62/612

(56) References Cited

U.S. PATENT DOCUMENTS

| | | | | |
|---|---|---|---|---|
| 2,041,725 A | | 5/1936 | Podbielniak | |
| 3,012,415 A | | 12/1961 | La Porte | |
| 3,203,194 A | * | 8/1965 | Fuerrer | 62/114 |
| 3,579,998 A | | 5/1971 | Thibault et al. | |
| 3,602,004 A | | 8/1971 | Peavler | |
| 3,665,723 A | | 5/1972 | Okutus | |
| 3,677,025 A | | 7/1972 | Payne | |
| 3,768,273 A | * | 10/1973 | Missimer | 62/502 |
| 3,878,691 A | * | 4/1975 | Asztalos | 62/512 |
| 3,932,158 A | * | 1/1976 | Hildebrandt | 62/513 |
| 4,189,930 A | * | 2/1980 | Davydov et al. | 62/502 |
| 4,506,513 A | | 3/1985 | Max | |
| 4,535,597 A | | 8/1985 | Missimer et al. | |
| 4,597,267 A | | 7/1986 | Forrest | |
| 4,689,964 A | * | 9/1987 | St. Pierre | 62/502 |
| 4,763,486 A | * | 8/1988 | Forrest et al. | 62/513 |
| 5,161,382 A | | 11/1992 | Missimer | |
| 5,207,065 A | * | 5/1993 | Lavin et al. | 165/166 |
| 5,220,097 A | * | 6/1993 | Lam et al. | 585/259 |
| 5,408,848 A | * | 4/1995 | Weng | 62/502 |
| 5,676,737 A | * | 10/1997 | Whitlock | 95/106 |

* cited by examiner

*Primary Examiner*—William E. Tapolcal
*Assistant Examiner*—Mohammad M. Ali
(74) *Attorney, Agent, or Firm*—Gray Cary Ware & Freidenrich LLP (57) ABSTRACT

A closed circuit refrigeration system of successive coalescent/depth filters provides the almost total removal of liquid refrigerants from a refrigeration gas stream. The liquid refrigerant so extracted is then be returned to the suction side through a metering device such as a capillary line to provide intermediate cooling of the oncoming discharge gas. The auto cascade system utilizes short path plate heat exchangers. The properties of coalescent/depth filters place a physical barrier between the differing temperature/pressure regimes on the discharge side of the system. The provision of a start valve in a line connecting the gas discharge path and the return path close to the cryo-coil enables the use of hermetic compressors and eliminates the requirement for supplementary pressure vessels within auto-cascade cryogenic refrigeration systems.

19 Claims, 4 Drawing Sheets

DISCONTINUOUS CRYOGENIC MIXED GAS REFRIGERATION SYSTEM AND METHOD

The application is a combination of and claims priority from provisional applications Ser. No. 60/293,759 filed on May 25, 2001, Ser. No. 60/252,948 filed Nov. 24, 2000 and Ser. No. 60/247,323 filed Nov. 10, 2000.

BACKGROUND OF THE INVENTION

This invention relates to refrigeration systems and more particularly to a closed circuit refrigeration system utilizing coalescent/depth filters.

The cryogenic mixed gas refrigeration system is a familiar system and has been described in numerous prior art documents such as U.S. Pat. Nos. 2,041,725, 4,535,597, 4,597,267, 4,689,964 and 5,161,382 and ASHRAE Refrigeration handbook, 1998, section 39.2. The limited application to which this technology has been put to is in part due to a number of sufficient shortcomings in the present systems. Prior art "auto-cascade" refrigeration systems have shown mixed gas systems to be an effective method of extending the normal temperature range of a refrigeration system with a single compressive step. Such systems are capable of cryogenic temperatures as low as −160° C. By using a mixture of gases with differing thermodynamic properties, the components of which under compression may be preferentially separated on the basis of phase, provide intermediate cooling of the discharge gas system.

A mixed gas refrigeration system can be described as an extended multi-zone economizer where high pressure gas discharged from the compressor is cooled by low pressure returning gas via a heat exchanger into which condensed liquid refrigerant is evaporated through a metering device such as a capillary line or a thermal expansion valve. The phrase change from liquid to gas serves to cool the discharge gas stream further.

Prior art cryogenic systems contain a mixture of gases, which are sequentially condensed and extracted into the return gas stream to cool the discharge gases. Currently disclosed systems use continuous tube-in-tube heat exchangers and tangential/vortex type phase separators placed at suitable points along the length of the heat exchanger.

The most prevalent application of the prior art technology has been its use in "cryogenic water vapor pumps". These are a type of vacuum pump commonly associated with the industrial applications of vacuum, e.g., coating of plastics/paper and the manufacture of semiconductors. Such systems are used to preferentially pump water vapor from high vacuum systems through the trapping of water onto a copper or stainless steel Meissner coil placed inside the vacuum chamber. The advantage of such systems has been their very fast water vapor pumping speeds. Advances in design have allowed the fast cycling of such systems through the common refrigeration practice of direct injection of hot gases into a Meissner coil. Common applications of cryogenic water vapor pumps are thin-film coatings and the processing of semiconductor devices.

During the cool-down of an "auto-cascade" system from ambient, almost all of the refrigerant charge exists in the gaseous phase, and consequently the gas flow rates are high. As the system cools to its equilibrium cryogenic temperature, certain components condense and are separated and returned through capillary lines to affect cooling of the oncoming gas stream. At equilibrium, flow rates are greatly reduced. The reduction in gas flow increases with distance from the compressor. Thus, to be efficient, any device designed to separate the two-phase components (gas/liquid) must be capable of operating effectively in two differing temperature/pressure/flow regimes. Prior art systems have employed either impingement or centrifugal (vortex) separation processes. Both separation methods operate at around 80% separation efficiency under optimal conditions. Often the two separation methods are combined which increases the operational range of the hybrid device but maximal efficiency is always compromised.

Two of the greatest technical challenges which face the engineer of these systems are the efficient separation of condensed components from the gas stream and prevention of contamination of the cryogenic parts of the system with compressor oil or less volatile components of the gas mixture. To be able to achieve the separation of condensed from non-condensed refrigerants has proved to be the limiting factor in the widespread commercial application of this technology.

The whole system must be capable of operating over a very wide range of temperatures, gas flows and pressures which exist in the system between start and achieving a cryogenic equilibrium. At start-up, the gas mixture can be deemed to be homogenous throughout the system and at high temperatures and pressure. Since all of the components are in the gas phase, the velocity of the gas is high. High gas velocities are ideal conditions for the impingement type of phase separator.

Once the system cools, the less volatile components are removed and returned to the compressor by being evaporated into the suction line further cooling the discharged gas and ultimately causing the condensation of further component. At equilibrium, each separation point corresponds to the corresponding temperature of a component gas, which is subsequently colder than the previous point. At this point in the cycle, the system is at low temperature and pressures and the gas velocity has dropped as a result of most of the gas charge being liquefied. A further consequence is that the composition of the discharge line changes with distance from the compressor.

The vortex separator (cyclonic) has been favored as it provides a lower pressure drop than mesh or sieve impingement types. The vortex type of separator separates droplets on the basis of centrifugal force. It therefore favors larger droplets moving within a high velocity gas stream. This is ideal just after start-up and at points closer to the compressor where gas velocities and mass flows are higher. However, their efficiency is greater compromised as the system cools and becomes cryogenic. The impingement filter has some similarities to a coalescent filter. However, the mean free path is small and the effective pore size large. Impingement phase separation works at low gas velocities where the droplets may have an increased residence time. Because of the opposing properties of a vortex and impingement phase separation, it is common to have both principals within the same separator.

Another principle difficulty encountered with a cryogenic auto-cascade system lies with the fact that to achieve the low temperatures gases with low boiling points such as methane or nobles gases must be used. Such gases are well above their critical temperature at normal temperatures. They thus follow the Boyles Law behaving as ideal gases where $PV=NRT$.

Since an auto-cascade refrigeration system as described is a closed system, the volume of system V, quantity of gas N and by definition the gas constant R do not change.

The change in state, which an ideal gas undergoes during compression, may be described by $$\frac{P1}{T1} = \frac{P2}{T2}$$

Here pressure P and temperature T are expressed in absolute units (pa and ° K)

Typical refrigeration compressor operating compression ratios are between 10:1 and 20:1. In such a system compressing an ideal gas (i.e. one above its critical temperature) would cause the temperature of gas discharged from the compressor to increase by several hundred degrees Kelvin. This is far in excess of the capabilities of commercial compressors.

A solution is to use an agent to quench the discharge gas temperature. The basis of the effect lies in the fact that its boiling point is sufficiently high that it only changes from liquid to gas at discharge temperatures and pressures encountered within a typical refrigeration system. The change in state from liquid to gas absorbs a large amount of energy suppressing any adiabatic temperature increase caused by the compression of and ideal gases to achieve low compressor discharge temperatures.

Prior art has shown the use of refrigerant R123 to be effective in controlling gas discharge temperatures in large conventional refrigeration systems. The use of R123 as a chloro-carbon has been shown to cause damage to tropospheric ozone layer.

Another difficulty with auto-cascade systems is the fact that they rely upon a large compressor displacement and a complex interrelationship between each of the heat exchangers and the liquid phase metering devices, which are almost invariably, copper capillary lines. The gases used which follow Boyles law are subject to very high degrees of adiabatic heating when compressed. This becomes a critical problem in autocascade systems because of the very high compressor displacements compared to the overall net cooling effect.

Thus at start up discharge pressures and temperatures rise rapidly. The issue of reducing temperature rise in discharge gas from the compressor by the addition of certain components is addressed by prior art. Pressure of gas upon start up would exceed the working limits of commercial compressors. This is particularly true for hermetically sealed compressors, which are enclosed within a pressure vessel having strict pressure capabilities. In small and medium sized systems hermetic compressors are favored because of their durability and leak tightness. These are both highly desirable and critical requirements for cryogenic systems.

The problem of hermetic compressors in the context of auto-cascade systems is that the large gas volume of their integral pressure vessels is immediately available on start up causing disastrous pressure increases within the system. Various solutions to this problem have been employed by prior art. Most commonly, the use of a reservoir to temporarily increase the working volume of the system has been employed in a number of commercially available systems. The disadvantages of these systems have been cost and difficulties in satisfying legislative requirements with regard to pressure vessels. Motor speed control of 3 phase compressors has also been evaluated; however they have proved to be less effective in autocascade refrigeration systems since the system requires a certain gas velocity to facilitate the separation of the liquid from the gas phase of the system.

All prior art systems have used low internal volume semi-hermetic or open compressor types coupled with an expansion tank.

Figure 1:
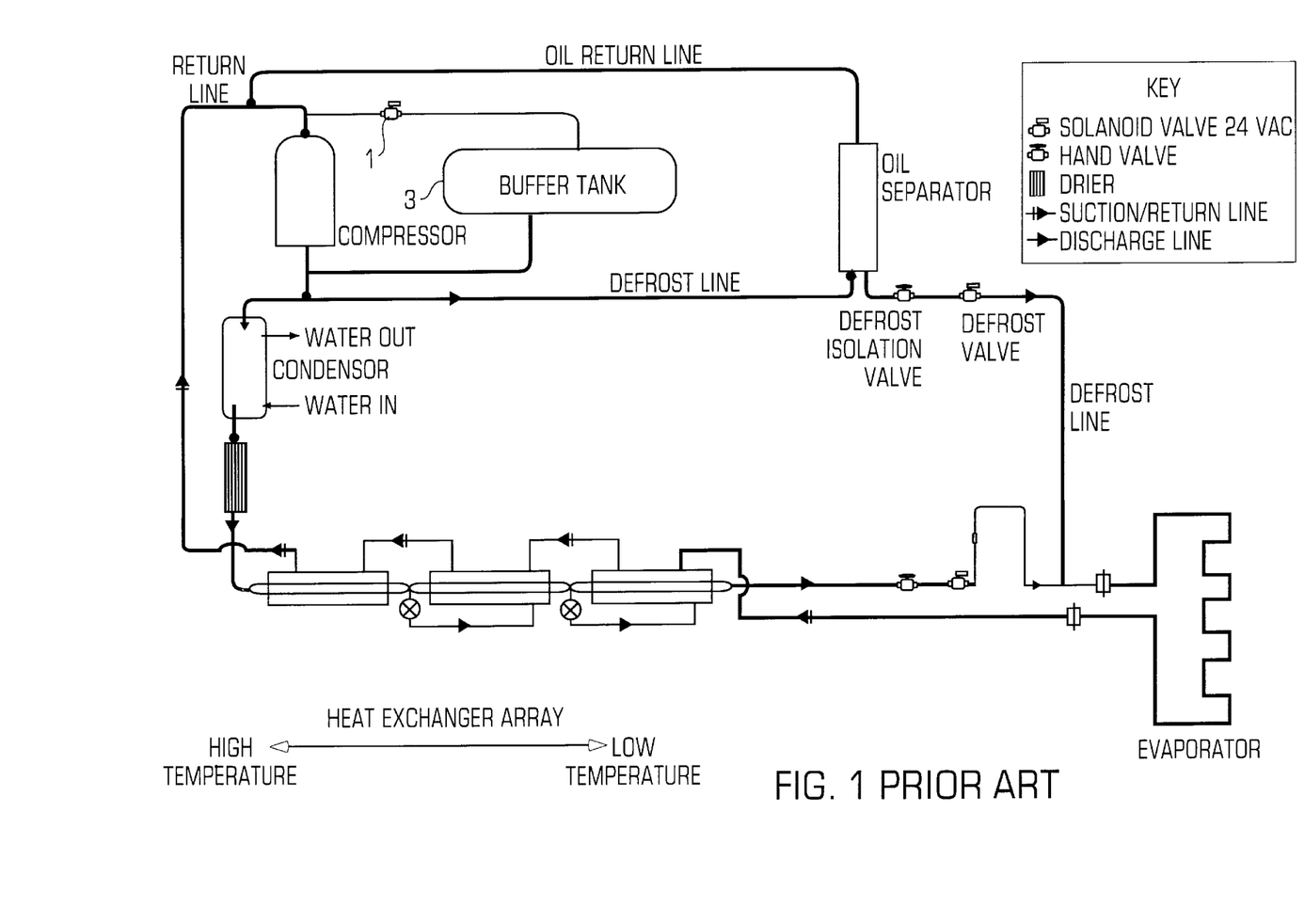
FIG. 1 is a schematic view showing the construction of a prior art system.

A typical prior art auto-cascade system is shown in FIG. 1 where to achieve a sufficient gas charge for cryogenic operation around half of the gas is pumped into a large storage tank 3 through a line directly connected close to the compressor discharge. The tank is typically over 3 times the total internal volume of the rest of the system. When the discharge pressure has dropped, valve 1 is opened and gas is reintroduced into the system close to the compressor inlet. The removal of the bulk of the charge means there is little gas available for suction cooling of the compressor. Secondly the gas contained in the buffer tank is not subject to any cooling and therefore adds a considerable load into the compressor on the opening of valve 1.

SUMMARY OF THE INVENTION

The present invention relates to a new application within a closed circuit refrigeration system of coalescent/depth filters to provide the almost total removal of liquid refrigerants from a refrigeration gas stream. The liquid refrigerant so extracted may then be returned to the suction side through a metering device such as a capillary line to provide intermediate cooling of the oncoming discharge gas. The efficiency of the coalescent membrane filter enables the use within an auto cascade system of short path plate heat exchangers. As contrasted with prior art systems with phase separation methods which have a continuous (i.e., open) path between each of the temperature regimes within the discharge line of the system, the present invention exploits the properties of coalescent/depth filters to place a physical barrier between the differing temperature/pressure regimes on the discharge side of the system. The point of placement of these coalescent filters at a point past the condensation point of a particular component of the mixture is critical.

The invention is a key improvement in the design of cryogenic auto cascade refrigeration systems since the plate heat exchangers used are significantly more efficient than the shell and tube solutions used in the prior art. The use of plate heat exchangers in such systems has been precluded by their short path length, which has resulted in oil migration into the cryogenic parts of the array, which in turn has led to unacceptable reliability.

The present invention relates to both the combination of the plate heat exchangers and coalescent phase separators assembled either together or separately within a cryogenic mixed gas refrigeration system. The invention provides a way in which these elements may be combined to form a functional element and how such elements may be joined in such a way as to form a highly efficient cryogenic refrigeration system.

The invention also covers specific elements of the control and design of such a system that takes advantage of the core technology as described to be an unique and effective method of generating cryogenic temperatures in a single compressive step.

Another feature of the invention is the provision of a start valve in a line connecting the gas discharge path and the return path close to the cryo-coil which enables the use of hermetic compressors and eliminates the requirement for supplementary pressure vessels within auto-cascade cryogenic refrigeration systems. This start valve controlled through the combined or separate measurement of gas temperature and pressure permits reduction of the pressure and temperature of gas during the start up and initial cool down phase within auto-cascade systems. The invention increases gas velocity during start up increasing heat transfer rates. The effectiveness of the system allows the use of the fully hermetic compressors without the use of large buffer or reserve pressure vessels in which the bulk of the systems gas charge is stored during start up and the initial cool down from ambient.

As an additional feature of the invention, a class of volatile liquids, normally used as industrial cleaning agents, is used in the refrigeration system.

DETAILED DESCRIPTION OF THE INVENTION

The present invention specifically addresses the difficulties of phase separation and heat transfer within a dynamic system. The invention enables the use of high efficiency plate-type heat exchangers, which because of a short path link and low-pressure drop have been found to be unsuitable with conventional "auto-cascade" refrigeration systems.

The invention relies upon the highly specific and unique ability of coalescent-type filters to separate the liquid phase refrigerant components often present as microscopically small droplets from the gaseous refrigerant independently of gas velocity/temperature. Coalescent filtration medium has found wide application in other area most notably in the removal of oil, smoke and other nuisance fumes from compressed air and breathing appliances.

Figure 2:
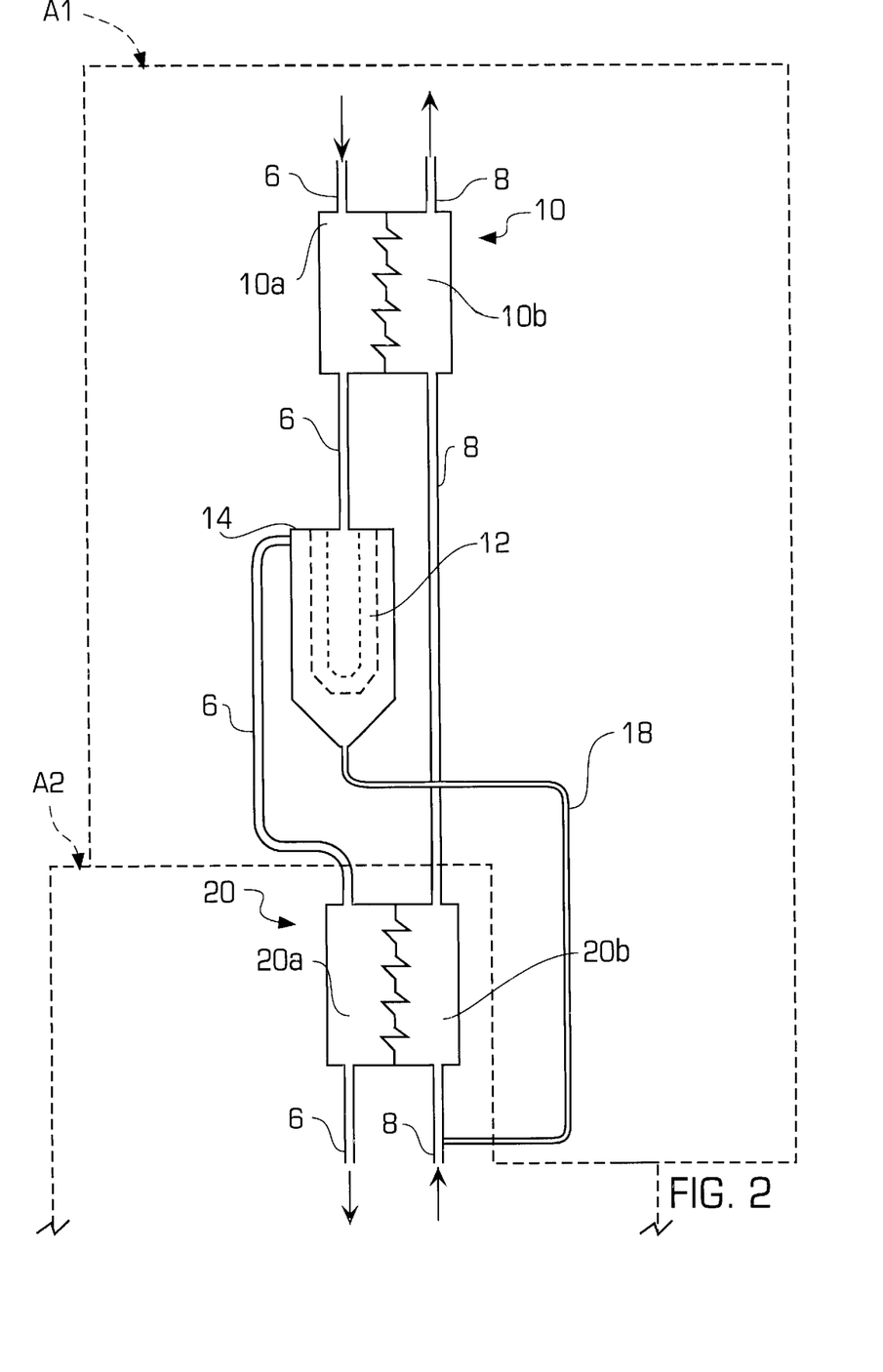
FIG. 2 is a schematic view of the parts that make up the auto-cascade element of the present invention.
Figure 3:
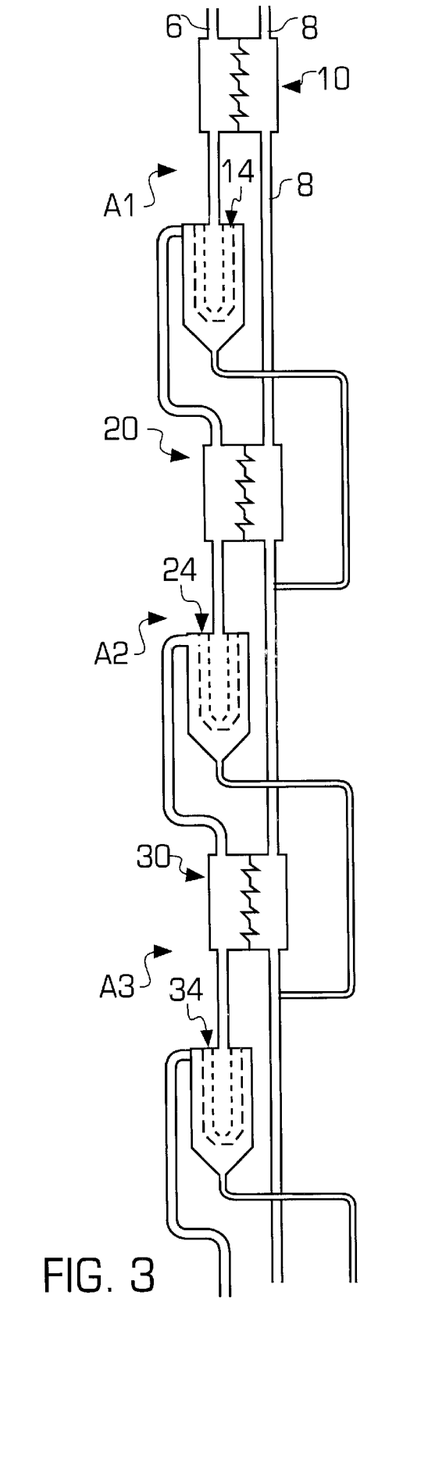
FIG. 3 is a schematic view of the improved auto-cascade elements shown linked as part of an array.

Referring now to FIG. 2, there is shown one heat exchanger/phase separation array element A1 and a portion of a successive array element A2. FIG. 3 shows three successive heat exchanger/phase separation elements A1, A2 and A3. Each array element A1, A2 and A3 includes a heat exchanger 10, 20 and 30, respectively, with a condensation side 10a, 20a and 30a through which passes discharged gas in a discharge line 6, typically under high pressure, and an evaporation side 10b, 20b and 30b which passes returned gas typically at low pressure in a suction/return line 8. The discharged gas from sides 10a, 10b and 10c passes in discharge line 6 to a coalescent phase separator or housing 14, 24 and 34 which includes a coalescent separation medium 12, 22 and 32 and a liquid reservoir at the bottom for separated liquids. The gas from the separators 14, 24 and 34 passes through discharge line 6 to the condensation sides 20a and 30a of the next heat exchangers 20 and 30 and the liquid from coalescent separators 14, 24 and 34 flows through capillary tubes 18, 28 and 38 to the upstream return line 8 side of the successive plate exchangers 20 and 30. As illustrated in FIGS. 2 and 3, each plate heat exchanger 10, 20 and 30 in the arrays A1, A2 and A3 is isolated from its discharge line 6 downstream neighbor heat exchanger 20 30 and 40 by the coalescent membrane 12, 22 and 32 of the phase separators 10, 20 and 30 to form a discrete thermal-physical environment. The significant advantage of this approach is that any liquid including entrained oil as micro-fine mist is prevented from passing to the colder parts of the system by the first coalescent member 10. This eliminates the problem of oil migration that is a major drawback of prior art systems. The issues encountered with prior art have been sticking valves and clogged capillary lines. Increased reliability because total prevention of old oil migration up the array is a key advantage of the present invention, since oil forms waxy deposits at temperatures lower than −60° C.

The coalescent membrane filters 12, 22 and 32 in multi-component gas refrigeration systems improve the separation of the liquid phase components from the mixed gas stream to enable plate heat exchangers 10, 20 and 30 to be used without the problems of condensate carryover to higher (colder) parts of the array. Migration of less volatile components causes fouling of the heat exchanger surfaces. Consequently, reduced heat transfer is a recognized problem associated with prior art systems. In the present invention, the coalescent phase separation is discontinuous and complete, i.e., it occurs at a single point within the system. Coalescent membranes 12, 22 and 32 have been found to be capable of removing better than 99% of the liquid components from a gas stream. The combination of coalescent phase separators 14, 24 and 34 and plate heat exchangers 10, 20 and 30 improves the efficiency and reliability of the invention over the prior art.

The separation of liquid phase refrigerants from a two-phase mixture with a membrane filter by coalescence of ultra-fine droplets is effective. The method has also been found to be independent of gas velocity by virtue of the fact that the filter has a large void volume compared to its total volume therefore generating negligible pressure drop. A fine microstructure means that the mean path that droplets have to take is orders of magnitude greater than the total filter depth. When this is related to droplet-size, the probability of a droplet impinging upon its neighbor is very high. The micro-fine droplets mists coalesce to form larger droplets. The dimensions of the larger droplets that continue to pass through the filter quickly exceed the notional pour size of the membrane resulting in the separation of the liquid from the gas phase.

Figure 4:
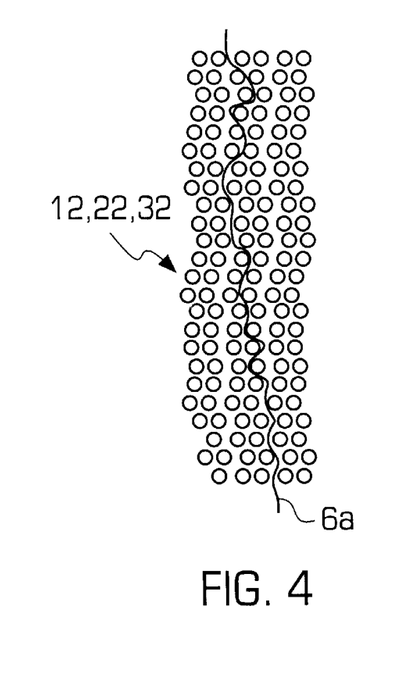
FIG. 4 is an enlarged schematic view of the filtration operation principals of the coalescent filter membranes utilized in the present invention.

Coalescent filter membranes 12, 22 and 32 are comprised of either ultra-fine fibers (polysulphone/borosilicate glass) or a low density centered matrix (polymer e.g., polypropylene or a metal powder e.g., stainless steel). Both types of membrane have been found to be effective. FIG. 4 illustrates the filtration principals of a typical flow path of a portion of the discharge stream 6a through the medium of the filter membranes 12, 22 and 32.

The key features of a coalescent membrane for the separation of refrigerant phases have been found to be:

large void volume/low pressure drop depth (i.e., a cross-section many thousands of times greater than the particle size)—high mean free path a fine micro-structure (i.e., thin fibers of centered particles)—large surface area wide availability of materials with chemical resistance to components found within refrigeration systems.

The high efficiency of capture greater than 98% for the coalescent filters compared with less than 85% for a conventional vortex system running under optimal conditions, enables greater cooling capacities to be achieved. It reduces the required gas charge required to achieve liquid sealing of the inlet of the expansion device. The reduction of gas charge eliminates the requirement for an expansion tank.

While the plate-type heat exchanger is a common method of achieving high heat transfer efficiencies between counter-flows of gases and in two-phase systems, until now it has been found to be unsuitable for "auto-cascade" systems because of short path length and low pressure drop across inlet/outlet. These factors have resulted in the carrying over of condensed liquid refrigerant in prior art systems into other sections of the auto-cascade system. This results in liquid starvation of the capillary line and fouling of the colder elements with the lower volatility components of higher viscosity. The use in the present invention of the plate-type heat exchangers coupled with coalescent separation has contributed to a greater than 10% gain in efficiency over prior art tube-in-tube based auto-cascade systems.

A typical coalescent medium can be fine glass fibers formed into a paper or a board such as sold by Temprite Texas U.S.A. and Valycontrol S.A. ED CV of Mexico. Other materials including sintered polymers were also evaluated; most of these were rejected on the grounds of commercial viability.

In the preferred embodiment of the present invention the area of the filtration media is by its nature applicable over a wide range from 20 to 300 square inches. The actual size depends upon the point at which the coalescent medium is applied in the array. The target pressure drop achieved over the filter is no more than a 2 psi drop across the coalescent filter and its connections as a whole. Thus, smaller filters are used the greater the distance from the compressor (in line with the reducing flow rate). It is the nature of the coalescent filter medium that whilst they do not exhibit an absolute pore size they have an effective pore size, which is determined by two factors, (1) the fineness of the medium (fibers or sintered particles) and (2) critically the depth from the inner to the outer surface. For all commercially available coalescent filtration media the effective pore size is considerably smaller than the entrained droplets of condensed refrigerant. Consequently there is a high efficiency of separation between the two phases. Coalescent filters are also independent of flow as they work on the basis of effective pore size compared with impingement types, which rely upon the momentum and size of the particle. The nature of autocascade systems means that gas velocities and temperatures vary widely under differing conditions, for example, the applied heat load.

Applicant's coalescent/depth membrane filter and plate heat exchanger system when used for the phase separation of refrigerants has the following advantages:

The higher efficiency of separation insures the liquid component is prevented from passing through to other parts of the system where they would cause fouling thereby reducing the efficiency of the heat exchange surfaces.

Insuring the liquid metering device (usually a capillary line) is always fed with liquid. Consequently, the amount of gas charge required to guarantee the capillary lines are fed with liquid is reduced.

Elimination of the possibility of migration of compressor oil, moisture or other contaminants to the cryogenic parts of the heat exchanger array. This is important as such components will block the capillary lines in these sections destroying the system.

The foregoing features are the enabling technology for the efficient use of high efficiency compact braised heat exchangers and auto-cascade cryogenic refrigeration systems.

With independence of gas velocity, which changes greatly during the cool down and operating cycle of an auto-cascade system, systems using coalescent membranes, being more resistant to thermal stress, are faster to recover from over loading and quicker to reach equilibrium from start.

Elimination of carryover of fluid inherent in short path plate heat exchangers.

Optimal heat/energy transfer through the use of plate heat exchangers.

Minimal temperature differential between discharge gas/liquid and return gas resulting in a sharp temperature gradient between each section of the array. This in turn increases the efficiency of condensation of the less volatile elements reducing the system charge.

Efficient condensate separation reduces the gas charge for given system capacity and eliminates the need for an expansion tank.

Lowered thermal mass results in faster cool down from the start.

Lowered thermal mass increases system recovery time following hot gas injection into the Meissner coil.

Efficient phase separation insures capillary lines are always fed with liquid making the system much less prone to "crash" should the heat load suddenly decrease.

The coalescent filter is a probability device, and not an absolute filter; the probability of liquid phase material passing such a device is infinitesimally small.

The practical advantage of high efficiency of heat transfer and therefore condensation within the heat exchange/separation element when coupled with the exceptional properties of a coalescent membrane phase separation device means the volume of condensed gas required to insure that the capillary lines are constantly fed with liquid is very much reduced compared to prior art disclosures.

Figure 5:
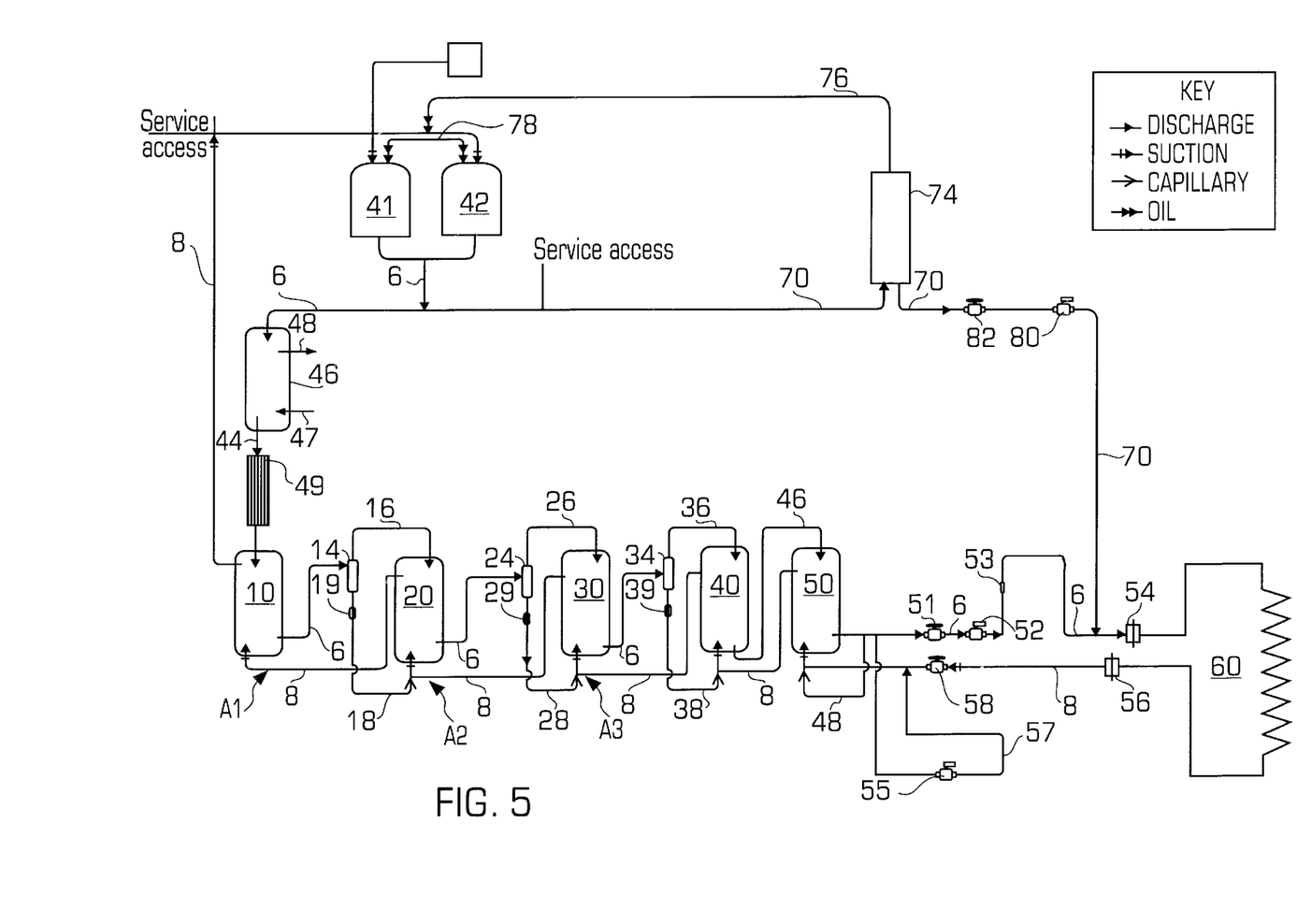
FIG. 5 is a schematic diagram of refrigerant flow in a gas refrigeration system utilizing the present invention.

A mixed gas cryogenic refrigeration system according to the present invention is set forth in FIG. 5. As shown in FIG. 5, a new auto-cascade system, which is both less sensitive to total gas charge and the ratios in which the gases are charged has significantly greater energy efficiency. The overall principal of operation is similar to prior art systems. However, as has been previously described, the system is truly discontinuous in respect to the discharge flows of vapor and liquid. Prior art systems are continuous with no delineation between each of the separate regimes.

In the preferred embodiment of a system incorporating the present invention in FIG. 5, discharge gas in the discharge line 6 from compressors 41 and/or 42 passes to a condenser 46 which has water circulating in the line 47 and out the line 48. From the condenser 46 the discharge line 6 passes through a system drier 50 to the heat exchanger/phase separation arrays A1, A2 and A3. These arrays A1, A2 and A3 respectively include the plate heat exchangers 10, 20 and 30 and phase separators 14, 24 and 34 which have gas exhaust in discharge line 6, and liquid removal in capillary lines 18, 28 and 38 which respectively include dryers 19, 29 and 39.

The discharge line 6 from array element A3 passes on first to a heat exchanger 40 and then to heat exchanger 50 with passage therefrom on discharge line 6 through ½" hand valve 51 through cool valve 52 and then through a capillary portion with a dryer 53 to the ½" ultra-seal connection 54 to the cryo-coil 60. The other end of the cryo-coil is connected to the suction/return line 8 via a ⅜" ultra-seal connection 56.

A line 57 containing a pressure and temperature controlled solenoid start valve 55 is connected to the high pressure discharge line 6 upstream of the cool valve 52 close to the cryo-coil 60 and to the low pressure return line 8 close to the connection 56.

The suction/return line 8 extends from the cryo-coil 60 and the start valve 55 to and successively through the heat exchangers 50, 40, 30, 20 and 10, and successively picking up the separated liquid from capillary lines 48, 38, 28 and 18, and ultimately reaching the input of the compressors 41 and 42.

A defrost/discharge branch line 70 extends from the discharge line 6 through an oil separator 74 with an oil return line 76 connected to the return line 8 to the input of compressors 41 and 42. An oil compensation line 78 is connected to the compressors 41 and 42. From the oil separator, the defrost discharge branch line 70 extends through a defrost valve 80 and a defrost isolation valve 82 to the discharge line 6 for passage to the cryo-coil 60.

This system contains the three improved auto-cascade elements which are linked in series to effect a fractional distillation of a blend of gases that under a single compressive step with twin compressors 41 and 42 running in parallel, achieves cryogenic temperatures in the evaporator or cyro or Meissner coil 60 through the evaporation of a low boiling point gas mixture. It is important to note that each auto-cascade element A1, A2 and A3 is divided from its neighbor by its coalescent membrane 12, 22, or 32, which excludes further migration of the liquid phase to colder parts of the array. This is the enabling step in the use of plate heat exchangers.

Prior to operation, the start valve 55 is opened. This reduces the impedance flow inherent in the system, which with the relatively small gas discharge means that there is no requirement for an expansion tank and capillary aligned as a gas reserve as utilized in the prior art. The elimination of the pressure vessel provides both safety and economic advantages. On start-up, one of the compressors 41 and 42 is run. The start valve 55 remains open to insure that discharge pressures and the compression ratio across the compressors are well within the design limits of the compressors. The compressors 41 and 42 may be alternated at initial start to insure wear is equalized. Control of all phases of the operation relies upon tight control by computer software to insure efficient and safe operation.

The most effective position for the start valve 55 is at the furthest point of the discharge line 6 of the system from the compressor just upstream of the cool valve 52. At this point the cool valve 52 and the defrost valve 80 remain closed until the system has reached a ready state and the user requires either cooling or defrosting of the evaporator.

The start valve 55 needs to provide sufficient impedance to the gas/vapor flow to generate a high enough pressure on the high-pressure side to ensure condensation of the least volatile components within the gas mixture at the condenser 46. The condensed liquids are separated and returned to the compressor via capillary lines 48, 38, 28, and 18. These then evaporate into the suction side return line 8 further cooling the discharge gas stream. The start valve 55 decreases the pressure of the discharge by increasing the flow between the high and low-pressure sides. The increased velocity of gas improves heat transfer between the high and low-pressure sides of the system via the heat exchangers 50, 40, 30, 20, and 10. As the system cools the volume of gas is reduced through both adiabatic cooling and condensation of less volatile components.

The maintenance of high mass flow between the high and low stages ensures that the compressors remain cool during the start up phase. The reduction of the compression ratio of the compressor improves its efficiency and further reduces thermal and mechanical stress on the compressors.

Because the hermetic compressors contain a considerable amount of compressed gas necessary for the correct function of the system, once it has achieved full condensation of the components all of the gas is immediately available for the process.

The zone of cooling can be seen to track back from the start valve 55. Once the discharge pressure at the compressor discharge line 6 and the coldest temperature of the system have reduced to an acceptable level, the start valve 55 is then closed. There is an immediate reduction in suction line pressure and correlating increase in discharge pressure. However since the system's coldest temperature has been reduced to below the critical temperature of the most volatile component in the gas charge, there is rapid condensation of these components which rapidly increases the mass flow through all of capillary lines 18, 28, and 38 and including the top return capillary line 48 which now passes liquid to the low pressure side of the system.

The capillary lines are then fed with liquid, which rapidly causes a reduction in both the discharge pressure and the suction temperature. Once appropriate values of each have been achieved, a computer-based control system monitors both variables and closes the start valve.

The system, by virtue of the efficient thermal transfer and low mass, cools down rapidly. The differential between the suction and discharge gas is typically as low as 10° C. Between the individual elements, the thermal transition is exceptionally well defined and is in contrast to prior art that employs a continuous heat exchange process. Within approximately twenty minutes from ambient, the auto-cascade ultimately reaches equilibrium. This is where all the coalescent phase separators 14, 24 and 34 are recovering liquid and the capillary lines are effective in cooling the discharge gas stream to the point of condensation. To accurately determine the point at which the system is ready to allow cooling of the Meissner coil, the pressure in both discharge and suction lines are monitored and together with temperatures at the separation points, these pressures are again processed by the control system. Once the critical parameters have been achieved, the system is then ready to provide cryogenically cooled liquefied gas to the Meissner coil.

If the start valve 55 is closed at too high a temperature or pressure then the system will exceed its safe operating pressure. Should the valve close too late, then the system tends to become less efficient as the gas velocities remain very high with relatively large quantities of liquid refrigerants being held in the discharge side. These can be entrained in the gas steam and carried further away from the compressor where the temperatures may be low enough to cause them to freeze out fouling the capillary lines.

The off loading of pressure and the increase in suction line cooling of the compressors is so effective that the system is able to effectively start from very high static pressures in excess of 200 psi without resorting to the storage of some of the charge outside of the system until equilibrium is achieved. The positioning of the start valve 55, its flow characteristics and the point at which cross over to normal running condition is made are all critical in achieving optimal operation in the system.

As with prior art systems, cooling is effected by the opening of the cool solenoid valve 52, the final evaporative step being achieved within the cryo-coil. There is little or no instability within the temperature of the cryo-coil following the opening of the cryo-coil. This is a significant advantage in cooling processes since the coating can be damaged by unpredictable releases of water vapor from the cryo-coil. At the end of the process, the coil is defrosted by opening the defrost valve 80 and closing the cool valve 52, injecting hot gas directly into the Meissner coil, a common process in refrigeration known as hot gas injection. The invention differs from prior art in that only a proportion of the discharge gas passes through the coil. The rest is maintained on auto-cascade array under electronic control. This insures the auto-cascade array is ready to cool the coil more or less simultaneously. The robustness of the array in achieving and maintaining its cryogenic status is a function of the improved auto-cascade elements of which it is comprised. Faster and more robust cycling is a key practical advantage of this invention.

During standby, one of the compressors 41 and 42 may be switched off to reduce power consumption. Since the load is reduced when there is no cooling of the cryo-coil, the array remains at its design condition but consumes approximately half the energy of a similar system. Multi compressors and increased capacity auto-cascade elements could be combined with little practical limit to effect a form of capacity control.

This invention covers the use of coalescent filtration through centered metal matrixes, organic or inorganic fibers and plate heat exchangers in combination or separately and is unique and novel to the application of cryogenic mixed gas refrigeration systems using a single compressive step.

Typical prior art systems and one embodiment of this invention use R123, R11 or other known refrigerants. A blend of gases with different thermal-physical properties in an auto-cascade system produces a cryogenic temperature by the expansion of a liquefied gas. Usually, this gas is a volatile organic moiety such as methane or its halogenated or its analogs or a high boiling point inorganic permanent gas argon being the most prevalent. The big problem with the use of such gases is the high compression ratio required that results in the generation of high discharge temperatures from the compressor as a result of adiabatic gain.

It is another feature of the present invention to use a class of volatile liquids normally used as industrial cleaning agents. They are of the following classes: hydrofluoroethers, perfluro-ethers and hydrofluroesters.

Of particular use is the dodecyl-fluro-pentane $C_5F_{12}$. This liquid has a characteristic of a boiling point of +30° C. and a high specific heat, and density. This makes it ideal in carrying to the condenser stage of an auto-cascade system the heat generated by adiabatic compression of the most volatile constituents of an auto-cascade system.

The primary advantages of $C_5F_{12}$ over R123, R11 and other known refrigerants are that it does not contribute to depletion of the ozone layer. Other fluids in the above series exhibit similar thermal-physical properties but are somewhat less chemically stable and may prove to be unsuitable for use within a refrigeration system.

It has been found that the use of $C_5F_{12}$ reduces the discharge temperature from the compressor in an auto-cascade system, and also increases the total heat rejected from the condenser element of the system. In trials, the fluid has proven to be chemically compatible with all the materials found within an auto-cascade system. The lack of chlorine in the molecule means that any degradation products are less likely to attack the stainless steel elements of the coalescent phase separators proposed in applicant's system.

Another set of novel compounds have been discovered to be effective in the quenching of compressor discharge gas temperatures within a cryogenic auto-cascade system. The effective quenching of high discharge gas temperatures through the use of novel ozone benign compounds makes such systems both commercially and environmentally viable.

The principle properties, which make these components suitable, are boiling points above the return gas temperature at system design pressure but below the acceptable discharge temperatures at typical refrigeration compressor discharge pressures.

The compounds must also have a large latent heat of vaporisation/condensation to be efficient. Many candidates were ruled out on this characteristic. The compounds must also be compatible with materials found within refrigeration systems. Low toxicity and flammability were also seen to be highly desirable attributes.

In an auto-cascade cryogenic refrigeration system components are discharged from the compressor at temperatures well above their individual critical temperatures. The compression causes adiabatic heating, which is directly proportional to the compression. The compounds above are effective in reducing discharge temperatures from the compressor by a partial change of state into their vapor form. The state change absorbs a disproportionate amount of energy compared with the adiabatic heating effect of the ideal gas component of the mixture.

I claim:

1. A cryogenic mixed gas refrigeration system comprising:
   a cryo-coil;
   a compressor;
   a discharge path for conveying fluid from said compressor to said cryo-coil;
   a return path for conveying fluid from said cryo-coil to said compressor; and
   at least one heat exchanger/coalescent phase separation array in said discharge path including:
      a heat exchanger for exchanging heat between fluid in said discharge and said return paths;
      a coalescent separation housing containing a coalescent medium in said discharge path receiving fluid from said heat exchanger for separating liquid and gas phases from each other in said discharge path;
      a gas outlet from said coalescent separation housing to said discharge path; and
      a liquid reservoir and outlet from said coalescent separation housing to said return path.

2. The cryogenic mixed gas refrigeration system of claim 1 including a plurality of said heat exchanger/coalescent phase separation arrays located sequentially along said discharge path from said compressor, the gas outlet from the coalescent separation housing in each of said arrays being connected to the inlet of a sequential heat exchanger located along said discharge path.

3. The cryogenic mixed gas refrigeration system of claim 2 wherein the liquid outlet from the coalescent separation housing in each of said arrays is connected to the return path inlet of a sequential heat exchanger along said discharge path.

4. The cryogenic mixed gas refrigeration system of claim 1, 2 or 3, wherein said heat exchanger in said heat exchanger/coalescent phase separation array is a plate having passages for said discharge and said return paths.

5. The cryogenic mixed gas refrigeration system of claim 1, wherein the system has a designed return gas temperature at the system design pressure and an acceptable discharge temperature at normal discharge pressure of said compressor and including refrigerant having a boiling point above said return gas temperature and below said acceptable discharge temperature.

6. A cryogenic mixed gas refrigeration system comprising:
   a cryo-coil;
   a compressor;
   a discharge path for conveying fluid from said compressor to said cryo-coil;

a return path for conveying fluid from said cryo-coil to said compressor; and at least one heat exchanger/coalescent phase separation array in said discharge path including:
- a heat exchanger for exchanging heat between fluid in said discharge and said return paths;
- a coalescent separation housing containing a coalescent medium in said discharge path receiving fluid from said heat exchanger for separating liquid and gas phases from each other in said discharge path;
- a gas outlet from said coalescent separation housing to said discharge path;
- a liquid reservoir and outlet from said coalescent separation housing to said return path;
- a refrigerant shut off valve in said discharge path upstream of said cryo-coil toward said compressor and;
- a start valve located in a line connected between said discharge path upstream of said shut off valve and said return path whereby with said shut off valve closed said start valve can be opened on or immediately prior to start up of the refrigeration system with operation of said compressor.

7. A cryogenic mixed gas refrigeration system comprising:
- a cryo-coil;
- a compressor;
- a discharge path for conveying fluid from said compressor to said cryo-coil;
- a return path for conveying fluid from said cryo-coil to said compressor; and
- a plurality of heat exchanger/coalescent phase separation arrays located sequentially along said discharge path each including:
  - a plate heat exchanger with passages for said discharge and said return paths for exchanging heat between fluid in said discharge and said return paths;
  - a coalescent separation housing containing a coalescent medium in said discharge path receiving fluid from said heat exchanger for separating liquid and gas phases from each other in said discharge path;
  - a gas outlet from said coalescent separation housing to said discharge path; and
  - a liquid reservoir and outlet from said coalescent separation housing to said return path.

8. The cryogenic mixed gas refrigeration system of claim 7 with the gas outlet from each coalescent separation housing in each of said arrays being connected to the inlet of a sequential heat exchanger located along said discharge path.

9. The cryogenic mixed gas refrigeration system of claim 8 wherein the liquid outlet from each coalescent separation housing in each of said arrays is connected to the return path inlet of a sequential heat exchanger along said discharge path.

10. The cryogenic mixed gas refrigeration system of claim 7, wherein the system has a designed return gas temperature at the system design pressure and an acceptable discharge temperature at normal discharge pressure of said compressor and including refrigerant having a boiling point above said return gas temperature and below said acceptable discharge temperature.

11. A cryogenic mixed gas refrigeration system comprising:
- a cryo-coil;
- a compressor;
- a discharge path for conveying fluid from said compressor to said cryo-coil;
- a return path for conveying fluid from said cryo-coil to said compressor; and
- a plurality of heat exchanger/coalescent phase separation arrays located sequentially along said discharge path each including:
  - a plate heat exchanger with passages for said discharge and said return paths for exchanging heat between fluid in said discharge and said return paths;
  - a coalescent separation housing containing a coalescent medium in said discharge path receiving fluid from said heat exchanger for separating liquid and gas phases from each other in said discharge path;
  - a gas outlet from said coalescent separation housing to said discharge path;
  - a liquid reservoir and outlet from said coalescent separation housing to said return path;
  - a refrigerant shut off valve in said discharge path upstream of said cryo-coil toward said compressor and
  - a start valve located in a line connected between said discharge path upstream of said shut off valve and said return path whereby with said shut off valve closed said start valve can be opened on or immediately prior to start up of the refrigeration system with operation of said compressor.

12. A cryogenic mixed gas refrigeration system comprising:
- a cryo-coil;
- a compressor;
- a discharge path for conveying fluid from said compressor to said cryo-coil;
- a return path for conveying fluid from said cryo-coil to said compressor; and
- a plurality of heat exchanger/coalescent phase separation arrays located sequentially along said discharge path each including:
  - a plate heat exchanger with passages for said discharge and said return paths for exchanging heat between fluid in said discharge and said return paths;
  - a coalescent separation housing containing a coalescent medium in said discharge path receiving fluid from said heat exchanger for separating liquid and gas phases from each other in said discharge path;
  - a gas outlet from said coalescent separation housing to said discharge path connected to the inlet of a sequential heat exchanger located along said discharge path;
  - a liquid reservoir and outlet from said coalescent separation housing to said return path connected to the return path inlet of a sequential heat exchanger along said discharge path;
  - a refrigerant shut off valve in said discharge path upstream of said cryo-coil toward said compressor; and
  - a start valve located in a line connected between said discharge path upstream of said shut off valve and said return path whereby with said shut off valve closed said start valve can be opened on or immediately prior to start up of the refrigeration system with operation of said compressor.

13. The cryogenic mixed gas refrigeration system of claim 12, wherein the system has a designed return gas temperature at the system design pressure and an acceptable discharge temperature at normal discharge pressure of said compressor and including a refrigerant having a boiling point above said return gas temperature and below said acceptable discharge temperature.

14. A cryogenic mixed gas refrigeration system comprising:
- a cryo-coil;
- a compressor;
- a discharge path for conveying fluid from said compressor to said cryo-coil;
- a return path for conveying fluid from said cryo-coil to said compressor; and
- a plurality of heat exchanger phase separation arrays located sequentially along said discharge path each including:
  - a plate heat exchanger with passages for said discharge and said return paths for exchanging heat between fluid in said discharge and said return paths;
  - a fluid separation housing for separating liquid and gas phases from each other in said discharge path;
  - a gas outlet from said separation housing to said discharge path connected to the inlet of a sequential heat exchanger located along said discharge path;
  - a liquid reservoir and outlet from said separation housing to said return path;
  - a refrigerant shut off valve in said discharge path upstream of said cryo-coil toward said compressor; and
  - a start valve located in a line connected between said discharge path upstream of said shut off valve and said return path whereby with said shut off valve closed said start valve can be opened on or immediately prior to start up of the refrigeration system with operation of said compressor.

15. The cryogenic mixed gas refrigeration system of claim 14, wherein the system has a designed return gas temperature at the system design pressure and an acceptable discharge temperature at normal discharge pressure of said compressor and including refrigerant having a boiling point above said return gas temperature and below said acceptable discharge temperature.

16. A cryogenic mixed gas refrigeration system comprising:
- a cryo-coil;
- a compressor;
- a discharge path for conveying fluid from said compressor to said cryo-coil;
- a return path for conveying fluid from said cryo-coil to said compressor;
- a refrigerant shut off valve in said discharge path upstream of said cryo-coil toward said compressor and;
- a start valve located in a line connected between said discharge path upstream of said shut off valve and said return path whereby with said shut off valve closed said start valve can be opened on or immediately prior to start up of the refrigeration system with operation of said compressor.

17. A method of operating a cryogenic mixed gas refrigeration system having a cryo-coil, a compressor, a discharge path for conveying fluid from said compressor to said cryo-coil and a return path for conveying fluid from said cryo-coil to said compressor comprising the steps of:
- compressing gaseous refrigerant
- cooling the compressed refrigerant into a cooled fluid refrigerant
- conducting the cooled refrigerant through a coalescent medium to provide a separated cooled gas and a separated cooled liquid
- passing the separated cooled gas along the discharge path toward the cryo-coil and passing the separated cooled liquid along the return path toward to cool compressed refrigerant.

18. The method of claim 17 wherein said cooling step is performed in a plate heat exchanger.

19. The method of claim 18 including additional steps of conducting the cooled refrigerant through sequential coalescent media to separate cooled gas from cooled liquid and passing the cooled gas along the discharge path and the cooled liquid along the return path.

* * * * *

UNITED STATES PATENT AND TRADEMARK OFFICE
CERTIFICATE OF CORRECTION

PATENT NO. : 6,644,067 B2
DATED : November 11, 2003
INVENTOR(S) : James Stenhouse It is certified that error appears in the above-identified patent and that said Letters Patent is hereby corrected as shown below:

<u>Title page,</u>
Item [73], Assignee, "Telmark Cryogenics Limited," should read -- Telemark Cryogenics Limited, --

Signed and Sealed this

Ninth Day of November, 2004

JON W. DUDAS
*Director of the United States Patent and Trademark Office*